United States Patent Office 3,274,142
Patented Sept. 20, 1966

3,274,142
RUBBER-MERCAPTAN BLENDS AND METHOD FOR THEIR PREPARATION
Paul F. Warner, Phillips, Tex., assignor to Phillips Petroleum Company, a corporation of Delaware
No Drawing. Filed Mar. 1, 1962, Ser. No. 176,801
12 Claims. (Cl. 260—30.2)

This invention relates broadly to polysulfide polymeric compositions useful as sealants, e.g., putty, calking compounds, and the like. In accordance with one aspect, this invention relates to dimercaptan-rubber blends. In accordance with another aspect, this invention relates to a method of preparing dimercaptan-rubber blends of improved physical properties useful as sealants. According to a further aspect, this invention relates to a sulfur curable sealant composition comprising rubber and a dimercaptan.

Putty compositions or sealants which can be converted to rubbery oil resistant solids under mild conditions of cure, are of interest where products are desired which have joints or seams therein, which, of necessity, must be water-tight, gas-tight, or resistant to hydrocarbon solvents. A particularly important application for sealants is found in the aircraft industry where efficient calking of aluminum seams is required in the fabrication of fuel cells or bunkers. Such sealants are used along the seams joining the aluminum sheet stocks and in the holes where rivets are to be placed. Sealants used in such applications must be flexible over a wide temperature range, resistant to hydrocarbon solvents and capable of being easily applied. Such sealants can also be used for the glass-to-metal seal in the windows of aircraft. Similarly, sealants or calking compounds are used in the building industry to seal around door and window frames. Also, such sealants are useful for binding solid propellants in rocket motors.

The present invention relates to novel putty or sealant compositions comprising a dimercaptan-rubber blend and to a method of preparing such a blend.

Accordingly, an object of this invention is to provide a novel putty sealant or composition.

A further object of this invention is to provide a liquid dimercaptan composition curable to a sealant composition.

A further object of this invention is to provide a method for curing a liquid mercaptan or dithiol to a rubbery product utilizable as a calking compound, a putty composition, a fuel tank sealing compound, a rocket fuel binder, shoe soles, etc.

A further object of this invention is to provide a putty or sealant prepared by sulfur curing a cyclic dithiol-rubber blend.

Other objects, aspects, as well as the several advantages of the invention will be apparent to one skilled in the art upon reading the accompanying disclosure and the appended claims.

According to this invention, these and other objects are broadly accomplished by a novel composition prepared by blending a liquid dimercaptan compound with a minor amount of a rubber and then incorporating sulfur in an amount sufficient to effect cure of said blend when the mixture or blend is subjected to mild curing conditions.

More specifically, according to the invention, it has been found that sulfur and sulfur-donor compounds and a basic material, e.g., an amine, are effective for curing liquid dimercaptans containing a minor amount of rubber to rubbery or plastic products utilizable as calking compounds, tank sealing compounds, rocket fuel binders, shoe soles, and the like. The putty or sealant compositions of the invention have flow characteristics which permit application to a solid surface by means of a knife or calking gun. The compositions also exhibit good adhesion to surfaces such as metal, wood, glass and the like even when immersed in a solvent, e.g., a hydrocarbon oil and are creep resistant so that undesirable flow or creep is minimized when the materials are applied to vertical surfaces. By proper control of the compounding ingredients, it is possible to prepare compositions of any desired consistency for application as well as to control the length of time necessary for the setting up of the composition. Furthermore, the compositions of the invention do not dry out and crack with age or show appreciable shrinkage, but, on the other hand remain somewhat flexible and have a long useful life.

The mercaptans that can be employed according to the invention can be represented by the formula HS—R—SH wherein R is an organic radical containing up to and including 20 carbon atoms per molecule. The hydrocarbon dimercaptans and especially the cyclic hydrocarbon dimercaptans as exemplified by 2,9-p-menthane dithiol are preferred. In the above formula, R can be a hydrocarbon radical such as aliphatic, cycloaliphatic, aryl and the like or a heterocyclic structure such as:

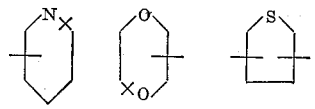

as well as other radicals.

Representative examples of suitable dimercaptan compounds that can be employed according to the invention include dimercapto ethane,
dimercapto propane,
1,5-dimercaptopentane,
1,6-dimercaptohexane,
1,8-dimercaptodecane,
2,3-dimercaptopentadecane,
1,6-dimercaptoeicosane,
1,4-dimercapto-2-butene,
1,8-dimercapto-2-octene,
dimercaptoethyl ether,
dimercaptopropyl ether,
dimercaptodipropyl sulfide,
dimercaptoxylene,
dimercaptodiethoxy benzene,
1,3-dimercaptoluene,
p-dimercaptobenzene,
dimercaptocyclohexane,
dimercaptomethylcyclohexane,
2,9-p-methane dithiol,
dimercapto-alpha-terpinene,
dimerctaptophellandrene,
dimercaptosylivestrene,
2,5-dimercaptopyridine,
dimercaptothiophene,
dimercapto-p-dioxane and the like.

The dithiols which are utilized in the blends of the invention can be produced by any of the known processes which yield these materials. Cyclic dimercaptans can be prepared conveniently, for example, by reacting a cyclic terpene with $H_2S$ in the presence of ultraviolet light.

The rubber materials used as additives for blending with the dimercaptans in the present invention can be either natural or synthetic rubbers. Rubber homopolymers of 1,3-butadiene having high cis-linkage and copolymers of conjugated dienes, especially butadiene, with monomeric materials copolymerizable therewith, such as styrene, are preferred. The synthetic rubbers which are utilized in the blended compositions of this invention can be produced by any of the known polymerization processes which yield these polymers.

The amount of rubber blended with the liquid dithiol will ordinarily range from about 5 to about 50 weight percent of the blend, preferably from about 10 to about 30 weight percent of the blend. The amount of rubber blended with the dithiol will depend upon the molecular weight and viscosity of the rubber and the procedure employed for preparing the blends.

Rubber polymers that can be employed for preparation of the blends of this invention include synthetic rubber polymers of open chain conjugated dienes having from 4 to 10 carbon atoms per molecule exemplified by 1,3-butadiene, 1,3-pentadiene, 2-methyl-1,3-butadiene (isoprene), 2,3-dimethyl-1,3-butadiene and the like, and rubber copolymers of these and similar conjugated dienes with each other or with copolymerizable materials containing a single ethylenic linkage such as styrene, alpha-methylstyrene, methylacrylate, methyl methacrylate, ethyl acrylate, ethyl methacrylate, 2-vinylpyridine, 2-methyl-5-vinylpyridine, 2-vinylquinoline, acrylonitrile or the rubber polymers or copolymers of such conjugated dienes as chloroprene and similar materials. In general, such rubber copolymers will be prepared from monomers comprising at least 50 weight percent conjugated dienes.

Natural rubber is well known to the art and no further discussion thereof is needed here.

The cis-polybutadienes which are utilized in the compositions of this invention can be produced by any of the known polymerization processes which yield predominantly cis-1,4-butadiene polymers. The cis-polybutadiene which can be employed in the rubber compositions of this invention will have a viscosity between 10 and 130 as measured on the Mooney viscosimeter at 212° F. (ML-4). A more desirable range of Mooney viscosity is from 20 to 60, inclusive. The polybutadiene as contemplated herein is one in which at least 75 percent and up to 100 percent, preferably 85 to 98 percent, of the polymer is formed by cis-1,4 addition of the butadiene and the remainder of the polymer being formed by trans-1,4 and 1,2-addition of the butadiene. Other stereospecific rubber polymers including high vinyl 1,2-addition and high trans-1,4-addition polymers can also be blended with the dithiols according to the invention.

The vulcanizing or curing agents that can be incorporated into the dithiol-rubber blends of the invention include free sulfur and sulfur-donor or sulfur-yielding compounds. Suitable sulfur-donor or sulfur-yielding compounds that can be used include thiuram polysulfides having the structural formula

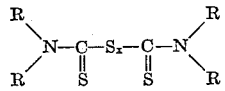

in which $x$ is 2, 3, or 4, R represents an alkyl or cycloalkyl group containing up to and including 10 carbon atoms, and the R's attached to a terminal nitrogen atom can be joined to form with said nitrogen atom a heterocyclic structure. Examples of such compounds are tetramethylthiuram disulfide, tetraethylthiuram trisulfide, tetraamylthiuram disulfide, tetradecylthiuram disulfide, tetraoctylthiuram disulfide, tetracyclohexylthiuram disulfide, dipentamethylenethiuram tetrasulfide, and the like.

Selenium dithiocarbamates of the formula

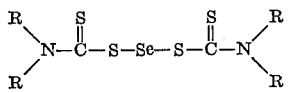

wherein the R groups represent alkyl or cycloalkyl radicals containing up to and including 10 carbon atoms, and the R's attached to a terminal nitrogen atom can be joined to form with said nitrogen a heterocyclic structure, can also be employed as the sulfur-yielding compounds. Examples of such compounds are selenium dimethyl dithiocarbamate, selenium diethyl dithiocarbamate, selenium didecyldithiocarbamate, selenium dioctyldithiocarbamate, selenium dinonyldithiocarbamate, selenium dicyclohexyl dithiocarbamate, selenium pentamethylenedithiocarbamate, and the like.

Other sulfur-donor compounds that can be used include N,N'-polythiodiamines of the formula

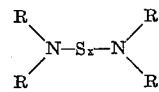

where $x$ is 2, 3, or 4, and R represents an alkyl or cycloalkyl group containing up to and including 10 carbon atoms, such radicals being purely hydrocarbon or substituted by cyano groups. The R groups can be joined to form heterocyclic structures which include the nitrogen atom, such heterocyclic structures being joined by juncture of alkyl groups or inclusive of oxygen, sulfur or nitrogen. Examples of such compounds are N,N'-dithiobis(diethylamine),
N,N'-dithiobis(dibutylamine),
N,N'-trithiobis(dihexylamine),
N,N'-dithiobis(dioctylamine),
N,N'-dithiobis(didecylamine),
N,N'-dithiobis(morpholine),
N,N'-dithiobis(thiamorpholine),
N,N'-dithiobis(piperidine),
N,N'-dithiobis(piperazine),
N,N'-dithiobis-(n-butylaminoacetonitrile),
N,N'-dithiobis-(beta-ethylaminopropionitrile),
N,N'-tetrathiobis(octyl-6-cyanooctylamine),
N,N'-dithiobis(dicyclohexylamine),
N,N'-dithiobis(decyl-5-cyanoamylamine),
N,N'-trithiobis(hexyl-9-cyanononylamine),
N,N'-dithiobis(n-butylaminopropionitrile), and the like.

Another class of compounds suitable for the purposes of the present invention are the thiazyl sulfides, including mercaptobenzothiazole, zinc 2-mercaptobenzothiazole, cupric 2-mercaptobenzothiazole, benzothiazyl disulfide, and the like.

An additional class of compounds suitable for the purpose of the invention include the disulfides of the general formula R—$S_x$—R in which $x$ is 2, 3, or 4 and R is an alkyl or cycloalkyl group containing from 1 to 16 carbon atoms. Typical examples of such compounds are dimethyl disulfide, diethyl disulfide, di-n-propyl disulfide, diisopropyl disulfide, diamyl disulfide, dicyclohexyl disulfide, dioctyl disulfide, didecyl disulfide, ditetradecyl disulfide, dihexadecyl trisulfide and the like.

The amount of sulfur curing agent employed in the curing of the dithiol-rubber blend according to the invention can vary appreciably but is usually in the range from 5 to 50 parts by weight per 100 parts by weight of dithiol with 10 to 30 parts by weight being preferred. The amount of sulfur added will depend upon the consistency desired for the final product. For example, larger amounts of sulfur result in tough, leathery products whereas the lower amounts result in sealants. The curing temperature employed will vary appreciably depending upon the particulaar curing agent and the desired rate of cure as well as the desired final consistency of the product. It has been found that the dithiol-rubber blends employed according to the invention can be effectively cured to a putty or sealant composition at room temperature in from about 2 to about 48 hours when employing a sulfur vulcanizing agent as set forth above. However, if desired, elevated temperature can be employed to speed up the cure.

During the curing operation, $H_2S$ is liberated and it is desirable to add a basic solvent or material to the blend to combine with the $H_2S$ and prevent frothing during the curing operation. Suitable $H_2S$ additives or acceptors that can be employed include basic materials such as the alkyl amines, for example, monoethanolamine, diethanolamine, triethanolamine, di-n-butylamine, dibenzylamine, tetramethylene pentamine, dimethylformamide, guanidine such as diphenyl guanidine, zinc oxide, zinc peroxide, and the like. The amount of such an additive incorporated in the blend will vary appreciably depending upon the amount of sulfur added, the rate of cure, the degree of cure, the amount of $H_2S$ liberated, and the like. However, in general, the amounts of these materials added is generally a stoichiometric amount and will ordinarily range from about 5 to about 50, preferably from about 10 to about 30 parts by weight per 100 hundred weight parts of dithiol.

Other additives such as fillers, e.g. carbon black, silica, titanium dioxide, zinc sulfide, calcium silicate, hydrated alumina, calcium carbonate, and the like, antioxidants, softeners, vulcanization activators, vulcanization accelerator-activators, and other additives and preservatives known in the rubber art can be present in the blend.

It is also within the scope of the invention to add a monomercaptan having up to 16 carbon atoms to the blend to control the molecular weight of the cured mixture. Furthermore, it is also within the scope of the invention to add a small amount of a polysulfide polymer to the blend to control the final properties. Polysulfide polymers prepared according to the procedures set forth in copending applications having Serial No. 141,994, filed October 2, 1961, and Serial No. 151,178, filed November 9, 1961, now U.S. Pat. 3,219,638, are particularly suitable.

The consistency of the vulcanized or cured dithiol-rubber blend cured according to the invention will vary depending upon the viscosity and the molecular weight of the dithiol and rubber used, the amount of sulfur vulcanizing agent employed during curing and the time and temperature of curing. These cured blends range from tough, rubbery materials to fairly soft, pliable compositions. The compositions of the invention prior to curing are sufficiently fluid to be easily applied to a base to coat same.

The blends of this invention can be prepared in a variety of different ways, but the preferred method of admixing the rubber with the liquid dithiol is to blend a solution of the rubber with the liquid dithiol and then evaporate off the rubber solvent. However, if desired, precipitated rubber can be incorporated into a liquid dithiol, but this procedure ordinarily takes more time than by blending according to the preferred procedure. After admixing or blending the rubber with a dithiol in the desired ratio, the resulting blend can be compounded and vulcanized by well known procedures ordinarily employed for compounding rubbers, for example, by utilizing mechanical mixers such as roll mills or Banbury mixers or other suitable means. After incorporation of the sulfur vulcanizing agent and any other additives desired, the blend can then be applied to the desired surface and allowed to cure.

A better understanding of the invention can be obtained by referring to the following illustrative examples, which are not intended, however, to be unduly limitative of the invention.

EXAMPLE I

A cyclic dithiol (2,9-p-menthane dithiol) was prepared by reacting dipentene (dl-limonene) with $H_2S$ in the presence of ultraviolet light. The contacting was effected at approximately atmospheric temperature (approximately 80° F.) in a mol ratio of $H_2S$ to dipentene of 9:1 in the presence of ultraviolet light.

Blends of the above dithiol containing 10 and 20 weight percent cis-polybutadiene were prepared. A solution of cis-polybutadiene and toluene was blended with the liquid dithiol at a temperature ranging from 200 to 300° F. The toluene solution contained about 14 weight percent cis-polybutadiene and the cis-polybutadiene had a cis content of approximately 95 percent. The cis-polybutadiene had a molecular weight of about 400,000 and a Mooney viscosity value (ML-4 at 212° F.) of about 45. The desired amount of cis-polybutadiene in toluene was added to the liquid dithiol and then the toluene was flashed out of the mixture leaving the cis-polybutadiene in solution in the 2,9-p-menthane dithiol. The solution obtained containing 10 weight percent cis-polybutadiene had a viscosity at 77° F. of about 200 poise and the blend containing 20 weight percent cis-polybutadiene was too viscous to flow at room temperature and the viscosity was not determined. The 20% solution is fluid at 200° F. and viscosity at this temperature would be approximately the same as that of the 10% solution at 77° F. For the curing tests sulfur, zinc peroxide and diphenyl guanidine were incorporated into the blends prepared above. The recipes employed are set forth below:

*Table I*

|  | 10% cis-Polybutadiene | 20% cis-Polybutadiene |
| --- | --- | --- |
| Dithiol solution, grams | 10 | 10 |
| Sulfur, grams | 3 | 3 |
| Zinc peroxide, grams | 4 | 4 |
| Diphenyl guanidine,[1] grams | 0.5 | 0.5 |

[1] 50 weight percent dissolved in dimethylformamide.

Both solutions containing the sulfur vulcanization agent and other additives cured into fairly tough, leathery products in two days at room temperature. The dithiol-rubber blend cured as set forth above applied to a metal has excellent calking and sealing compositions.

EXAMPLE II

Additional runs were made curing dithiol-rubber blends with different amounts of sulfur employing the same dithiol and rubber and the same procedure as in Example I. The recipes employed are set forth below. The dithiol solution for Runs 1, 3 and 4 contained 20 weight percent cis-polybutadiene and Runs 2 and 5 contained 10 weight percent.

*Table II*

| Run | 1 | 2 | 3 | 4 | 5 |
| --- | --- | --- | --- | --- | --- |
| Dithiol solution, grams | 10 | 10 | 10 | 10 | 10 |
| Sulfur, grams | 6 | 5 | 5 | 5 | 3 |
| ZnO, grams |  |  | 2 | 2 | 3.7 |
| ZnO$_2$, grams | 3 |  |  |  |  |
| Monoethanolamine, grams | 0.5 | 0.5 | 0.5 |  |  |
| Dimethylformamide, grams |  |  |  | 0.5 |  |
| Diethanolamine, grams |  |  |  | 0.5 |  |
| Carbon black, grams |  |  |  |  | 2.3 |
| Remarks | (1) | (1) | (2) | (3) | (3) |

[1] Set in 1 hr.
[2] Set in 1 day.
[3] Set in 2 days.

From the above data, it can be seen that the curing time, degree of curing, and the like can be controlled by the additives incorporated into the rubber-dithiol blend. The product obtained from Run 1 was a very tough, hard material suitable for use as shoe soles. The product obtained in Run 1 was flexed repeatedly without failing. The product obtained in Run 4, however, was a pliable, rubbery product suitable for use as a putty or calking composition.

The solution of rubber in 2,9-p-menthane dithiol (or other dithiol) can further be fortified by addition of liquid polysulfide polymers of 2,9-p-menthane dithiol. Such polymers are prepared by adding sulfur to 2,9-p-menthane dithiol in small increments until the desired viscosity is reached. Usually about 0.5 to 1.0 mol of sulfur per mol of 2,9-p-menthane dithiol is required to give the desired viscosity. The following data are for polymers of this type.

| | | | |
|---|---|---|---|
| Mol ratio sulfur to dithiol | 1.0 | 0.75 | 0.5. |
| Mol Wt | 875 | 524 | 369. |
| Total sulfur, Wt. percent | 31.8 | 31.1 | 31.39. |
| Mercaptan sulfur, Wt. percent | 6.1 | | 13.25. |
| Viscosity poise | 70 at 200° F | {4.5 at 200° F, 76 at 77° F} | 5 at 77° F. |
| Color, Gardner | 2 | 1 | 1. |

As will be evident to those skilled in the art, various modifications of this invention can be made or followed in the light of this disclosure and the discussion without departing from the spirit or scope of this disclosure or from the scope of the claims.

I claim:

1. As a new composition of matter, a blend consisting essentially of about 95–60 weight parts of a liquid dithiol which has the general formula HS—R—SH wherein R is an organic radical containing from 1–20 carbon atoms, and about 5–40 weight parts of a non-halogenated rubbery polymer selected from the group consisting of homopolymers of conjugated dienes, and copolymers of conjugated dienes with monomers having an ethylenic linkage copolymerizable therewith.

2. The sulfur-cured product of claim 1.

3. A composition according to claim 1 wherein said rubber is a polybutadiene which contains at least 75 percent of the butadiene joined together by cis-1,4 linkage.

4. A curable composition consisting essentially of a liquid cyclic dimercaptan which has the general formula HS—R—SH wherein R is an organic radical containing up to and including 20 carbon atoms per molecule, containing 5–40 weight percent of a non-halogenated rubbery polymer selected from the group consisting of homopolymers of conjugated dienes, and copolymers of conjugated dienes with monomers having an ethylenic linkage copolymerizable therewith, and a curable amount of sulfur.

5. A composition according to claim 4 wherein said dimercaptan is 2,9-p-menthane dithiol and said rubbery polymer is a polybutadiene which contains at least 75 percent of the butadiene joined together by cis-1,4 linkage.

6. As an article of manufacture, a cured composition consisting essentially of (1) 95–60 weight parts of a dimercaptan having up to and including 20 carbon atoms per molecule and (2) 5–40 weight parts of a non-halogenated rubbery polymer selected from the group consisting of homopolymers of conjugated dienes and copolymers of conjugated dienes with monomers having an ethylenic linkage copolymerizable therewith, said composition having been cured with a sulfur vulcanization agent, and at least one basic $H_2S$ acceptor that will combine with $H_2S$.

7. The composition of claim 6 wherein said dimercaptan is 2,9-p-menthane dithiol, said rubbery polymer is a polybutadiene which contains at least 75 percent of the butadiene joined together by cis-1,4 linkage, and in which a vulcanization system comprising free sulfur, a zinc oxide and an amine material is used.

8. A sulfur-vulcanized mixture of a dithiol having up to and including 20 carbon atoms per molecule containing substantially only 10–20 weight percent of a polybutadiene which contains at least 75 percent of the butadiene joined together by cis-1,4 linkage.

9. A method for preparing a sealant composition which comprises blending together about 95–60 weight parts of a liquid dithiol which has the general formula

HS—R—SH wherein R is an organic radical containing from 1–20 carbon atoms with about 5–40 weight parts of a non-halogenated rubbery polymer selected from the group consisting of homopolymers of conjugated dienes and copolymers of conjugated dienes with monomers having an ethylenic linkage copolymerizable therewith and sulfur.

10. A method for preparing a sealant composition which comprises blending together a composition consisting essentially of about 95–60 weight parts of a liquid dithiol which has the general formula HS—R—SH wherein R is an organic radical containing from 1–20 carbon atoms and about 5–40 weight parts of a non-halogenated rubbery polymer selected from the group consisting of homopolymers of conjugated dienes and copolymers of conjugated dienes with monomers having an ethylenic linkage copolymerizable therewith, and sulfur.

11. A process for the vulcanization of a liquid dithiol to a rubbery product which comprises curing a cyclic dithiol having up to and including 20 carbon atoms per molecule containing essentially only about 5 to 40 weight percent of a non-halogenated rubbery polymer selected from the group consisting of homopolymers of conjugated dienes and copolymers of conjugated dienes with monomers having an ethylenic linkage copolymerizable therewith in the presence of sulfur.

12. The product of claim 11.

References Cited by the Examiner

UNITED STATES PATENTS

| | | | |
|---|---|---|---|
| 2,463,219 | 3/1949 | Trepoynier | 260—30.8 |
| 2,543,844 | 3/1951 | Fryling | 260—30.8 |
| 3,041,304 | 6/1962 | Gardner | 260—795 |
| 3,081,352 | 3/1963 | Gardner | 260—609 |

OTHER REFERENCES

Makromal Chem. 35, 1960 (Natta) (page 130 relied on).

JOSEPH L. SCHOFER, *Primary Examiner.*

WILLIAM H. SHORT, *Examiner.*

M. P. HENDRICKSON, F. L. DENSON,
*Assistant Examiners.*